(12) United States Patent
Julian et al.

(10) Patent No.: US 9,348,419 B2
(45) Date of Patent: May 24, 2016

(54) METHOD FOR SYNCHRONIZING OPERATION OF SYSTEMS

(71) Applicant: Leap Motion, Inc., San Francisco, CA (US)

(72) Inventors: Ryan Christopher Julian, Berkeley, CA (US); Hongyuan He, San Francisco, CA (US); David Samuel Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 311 days.

(21) Appl. No.: 14/163,816

(22) Filed: Jan. 24, 2014

(65) Prior Publication Data

US 2015/0211919 A1   Jul. 30, 2015

(51) Int. Cl.

| | | |
|---|---|---|
| *G06M 7/00* | (2006.01) | |
| *H01L 27/00* | (2006.01) | |
| *H01J 40/14* | (2006.01) | |
| *G06F 3/01* | (2006.01) | |
| *G01S 17/06* | (2006.01) | |
| *G06F 3/03* | (2006.01) | |

(52) U.S. Cl.
CPC .................. *G06F 3/017* (2013.01); *G01S 17/06* (2013.01); *G06F 3/0304* (2013.01)

(58) Field of Classification Search
CPC .................. H01L 27/14643; H01L 27/14609; G01V 8/20; F16P 3/14; G06F 3/04883; G06F 3/017; G06F 3/016; G06F 3/011; G06F 3/0202; G06F 3/0219; G06F 3/0488; G06F 3/0421; G06F 3/0412; A63F 13/06; A63F 13/10; A63F 2300/1062

USPC ............... 250/221, 214 R, 214.1, 205, 252.1, 250/339.09, 341.5, 559.1; 345/156–184, 345/473, 474; 356/3, 4.01, 4.07, 5.01, 5.02, 356/614–623; 463/36–39; 700/11, 13, 17, 700/264; 382/118, 103
See application file for complete search history.

(56) References Cited

U.S. PATENT DOCUMENTS

| | | |
|---|---|---|
| 2003/0093805 A1 | 5/2003 | Gin |
| 2005/0075575 A1 | 4/2005 | Vo-Dinh |
| 2005/0279172 A1 | 12/2005 | Schreier et al. |
| 2008/0198039 A1 | 8/2008 | Philiben |

(Continued)

OTHER PUBLICATIONS

International Search Report and Written Opinion in corresponding International Application No. PCT/US2015/012441, Apr. 9, 2015; 10 pages.

*Primary Examiner* — Pascal M Bui Pho
(74) *Attorney, Agent, or Firm* — Haynes Beffel & Wolfeld LLP

(57) ABSTRACT

First and second detection systems coupled to a controller are synchronized, with the first detection system including first emission and detection modules while the second detection system includes a second detection module, for emitting radiation towards and detecting radiation from a region. A pulse of radiation emitted from the first emission module is detected by the first and second detection modules for a first time interval starting at time T1 and for a second time interval starting at time T2, respectively. The radiation received is compared to determine a radiation difference measurement. The starting time T2 is adjusted relative to starting time T1 based at least in part upon the radiation difference measurement to determine a revised starting time T2, thereby aiding the synchronization of starting time T2 with starting time T1.

15 Claims, 10 Drawing Sheets

(56) References Cited

U.S. PATENT DOCUMENTS

| | | |
|---|---|---|
| 2013/0235163 A1 | 9/2013 | Joo |
| 2014/0021356 A1 | 1/2014 | Zwaans et al. |
| 2015/0015482 A1* | 1/2015 | Njolstad ............... G06F 3/0386 345/156 |

* cited by examiner

METHOD FOR SYNCHRONIZING OPERATION OF SYSTEMS

BACKGROUND

At times it is desired to synchronize the operation of two or more systems. These systems could include, for example, wireless network routers synchronized so that they see one another's signals, cameras with subject auto detection, or detection systems which use, for example, emission modules emitting radiation towards an object in space and detection modules capable of detecting radiation from the modules.

BRIEF SUMMARY

The examples described below will primarily refer to synchronizing detection systems but the concepts can find utility with other systems in which synchronization would be useful. These synchronizing techniques can be used to synchronize detection systems of the type having emission modules and detection modules in arbitrary, but physically proximate, configurations.

A first example of a method for synchronizing operation of first and second detection systems coupled to a controller is carried out as follows. The first detection system includes a first emission module and a first detection module while the second detection system includes a second detection module. The emission module is capable of emitting radiation towards a region and the detection modules are capable of detecting radiation from the region. A pulse of radiation is emitted from the first emission module. The emitted radiation is detected by the first and second detection modules, the detected radiation being at least in part from the pulse of radiation. The first detection module receives radiation from the first emission module for a first time interval starting at time T1. The second detection module receives radiation from the first emission module for a second time interval starting at time T2. The radiation received by the first and second detection modules is compared to determine a radiation difference measurement. The starting time T2 is adjusted relative to starting time T1 based at least in part upon the radiation difference measurement to determine a revised starting time T2, thereby aiding the synchronization of starting time T2 with starting time T1. Some examples can include one or more the following. The emitting step can include emitting a pulse of radiation to an object within the region. The emitting, detecting, comparing and adjusting steps can be repeated until the radiation difference measurement reaches a desired value. The pulse of radiation emitting can start at time T1 and can stop at time T3, time T3 following time T2 for at least an initial radiation emission and an initial radiation detection. The comparing can include comparing an amount of the radiation received by the first detection module and an amount of radiation received by the second detection module.

A second example of a method for synchronizing operation of first and second detection systems is carried out as follows. The first and second detection systems respectively include first and second detection modules coupled to a controller, the detection modules being capable of detecting radiation from a region. Radiation from a region is detected by the first and second detection modules by: receiving, by the first detection module, radiation from the region for a first time interval starting at time T1; and receiving, by the second detection module, radiation from the region for a second time interval starting at time T2. The radiation received by the first and second detection modules is compared to determine a radiation difference measurement. The starting time T2 is adjusted relative to starting time T1 followed by repeating the detecting and the comparing until the radiation difference measurement reaches a desired value. In some examples, the detecting, comparing and adjusting are repeated until the radiation difference measurement reaches a desired value. In some examples, the comparing comprises comparing an amount of the radiation received by the first detection module and an amount of radiation received by the second detection module.

A third example of a method for synchronizing operation of first and second detection systems, coupled to a controller, is carried out as follows. The first detection system includes an emission module and the second detection system includes a detection module, the emission module capable of emitting radiation towards a region and the detection module capable of detecting radiation from the region. A pulse of radiation is emitted from the emission module. The emitted radiation is detected by the detection module, the detected radiation at least in part from the pulse of radiation. The detection module receives radiation from the emission module for a first time interval starting at time T1. The detection module receives radiation from the emission module for a second time interval starting at time T2. The radiation received by the detection module during the time periods T1 and T2 is compared to determine a radiation difference measurement. The starting time for receiving radiation by the detection module is adjusted based at least in part upon the radiation difference measurement, thereby aiding the synchronization of the emitting and detecting of radiation.

An example of a method for synchronizing operation of first and second systems is carried out as follows. The first and second systems respectively include first and second detection modules coupled to a controller, the detection modules being capable of detecting a pulsed signal. A pulsed signal is detected by the first and second detection modules by: receiving, by the first detection module, a pulsed signal for a first time interval starting at time T1; and receiving, by the second detection module, a pulsed signal for a second time interval starting at time T2. The pulsed signals received by the first and second detection modules are compared to determine a signal difference measurement. The starting time T2 is adjusted relative to starting time T1 followed by repeating the detecting and the comparing until the signal difference measurement reaches a desired value.

Other features, aspects and advantages of the disclosed technology can be seen on review the drawings, the detailed description, and the claims which follow.

BRIEF DESCRIPTION OF THE DRAWINGS

FIG. 4 illustrates the arrangement shown in FIG. 3 but in which the emission module of the second detection system is inactivated.

FIG. 5 illustrates the result of adjusting the starting time of the detection module of the second detection system resulting in a larger overlapped period of time.

FIG. 6 illustrates result of repeating the process until the brightness perceived by detection module of the second detection system is at a maximum level.

FIG. 7 shows both detection systems operating with all periods of time starting at the same time and ending at the same time.

DETAILED DESCRIPTION

Figure 1:
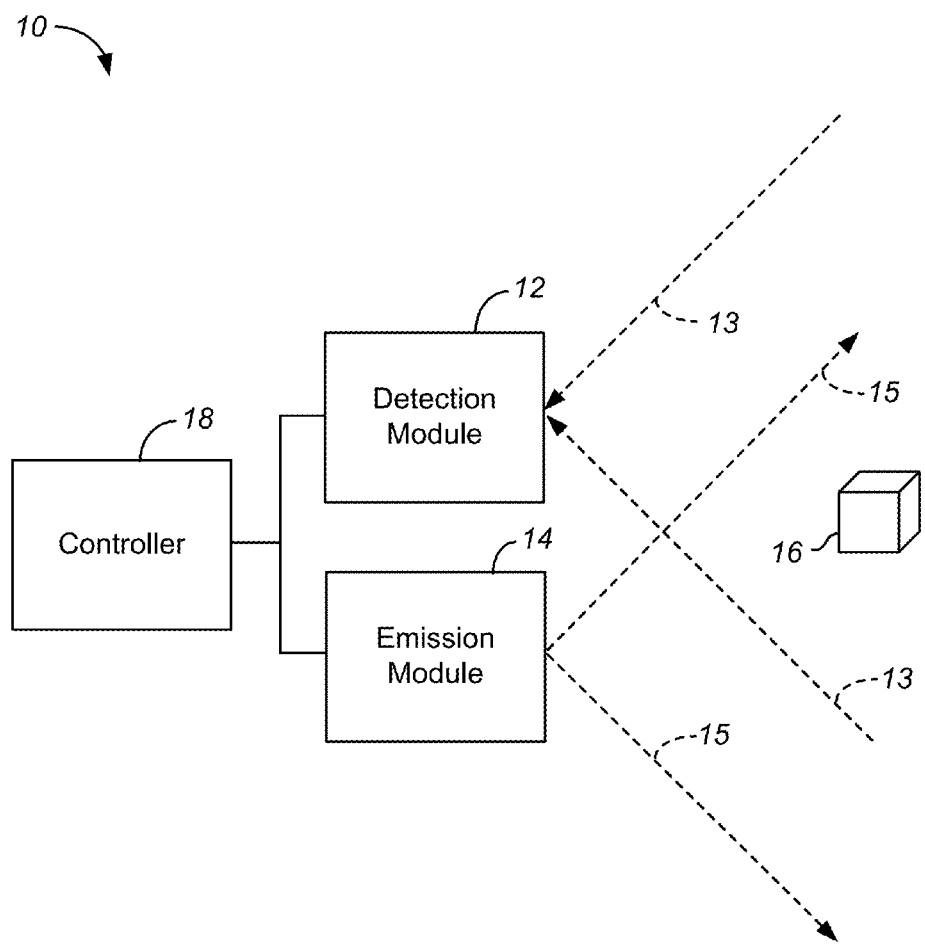
FIG. 1 illustrates an exemplary detection system including a detection module, an emission module and a controller for processing data from the detection module to identify and/or characterize the object(s), in conjunction with synchronization techniques might be embodied.

The following description will typically be with reference to specific structural embodiments and methods. It is to be understood that there is no intention to limit the technology disclosure to the specifically disclosed embodiments and methods but that the disclosed technology may be practiced using other features, elements, methods and embodiments. Preferred embodiments are described to illustrate, not to limit scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

Aspects of the systems and methods described herein provide for determining positional information (e.g., location, and/or orientation) for at least a portion of a target object within a field of view. Among other aspects, embodiments can enable objects and/or features of an object surface to be automatically (e.g. programmatically) determined using positional information in conjunction with receiving input, commands, communications and/or other user-machine interfacing, gathering information about objects, events and/or actions existing or occurring within an area being explored, monitored, or controlled, and/or combinations thereof.

An exemplary detection system 10, see FIG. 1, includes (i) a detection module 12 that can take the form of a camera, photo detector arrangement, other optical sensor arrangements or combinations thereof for acquiring images of an object 16; (ii) an emission module 14 that can take the form of an LED or other light source, other source of electromagnetic radiation or combinations thereof used to illuminate object 16, and (iii) a computer 18 (or other devices) suitable for processing the images to identify and/or characterize the object. In some examples, no particular object need be detected—for example, when just light is broadcast to a scene including random objects. In some examples, emission module 14 can create a sonic or pressure wave with detection module 12 configured to detect sonic or pressure waves. A computer display or other presentation device(s) may be used to display information related to the identified/characterized object. A detailed description of an example of a detection system 10 is provided below in the section entitled Overview of Machine Sensory and Control Systems in the starting with FIG. 11.

Figure 2:
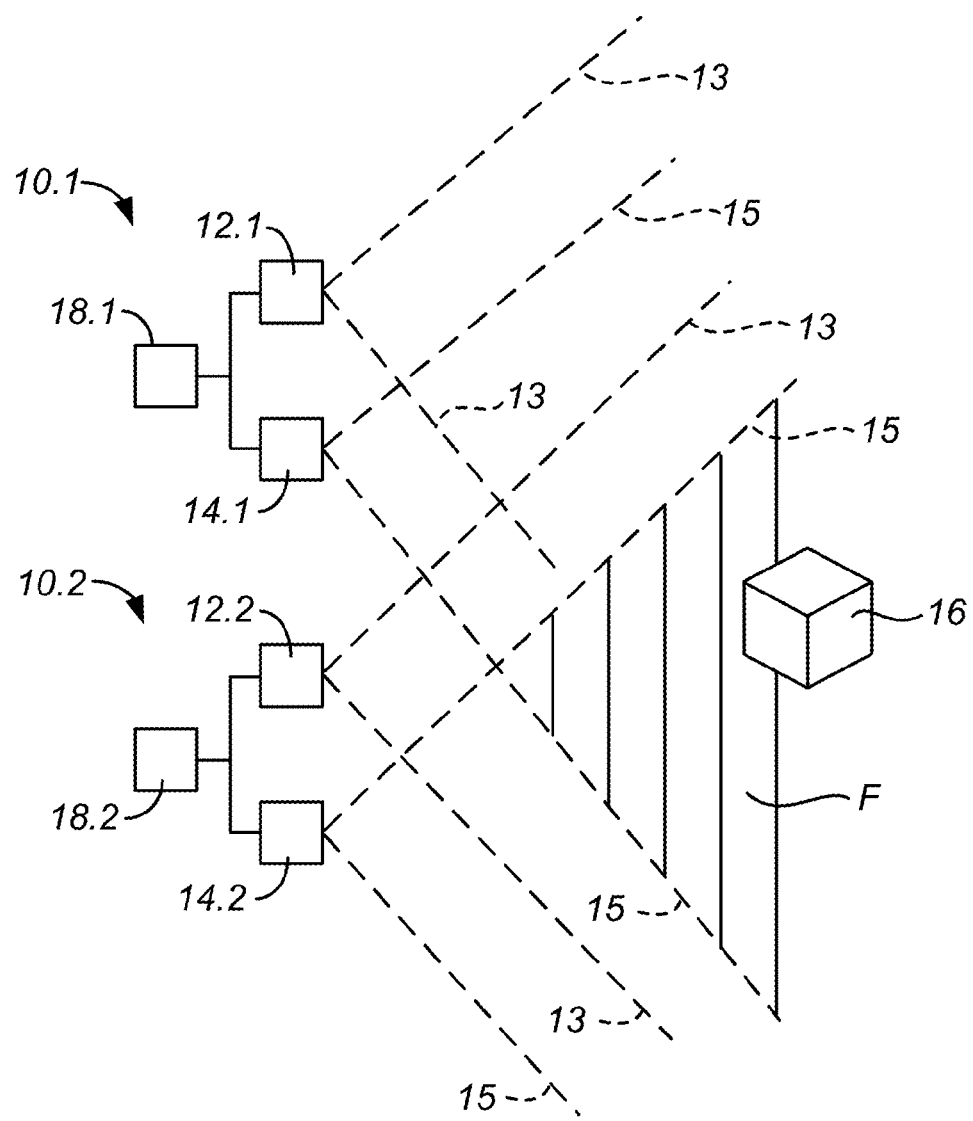
FIG. 2 illustrates an example of the use of first and second of the detection systems of FIG. 1.

FIG. 2 illustrates the use of first and second detection systems 10.1 and 10.2 with object 16. Object 16 is within a region F, region F defined by the overlapping light or other radiation pulses 15, illuminated by emission modules 14 of both of the first and second detection systems 10.1 and 10.2. As illustrated by FIG. 2, light or other electromagnetic radiation sourced by one of the emission modules, e.g., emission module 14.1 for example, can be received by more than one of the detection modules, e.g., detection module 12.2 for example. In certain implementations, noise or extraneous information introduced into the output of one or more of the detection modules 12 by such stray light, ambient electromagnetic radiation, background radio waves other noise or combinations thereof can be eliminated or reduced by practice of the techniques described herein with reference to example embodiments.

Figure 3:
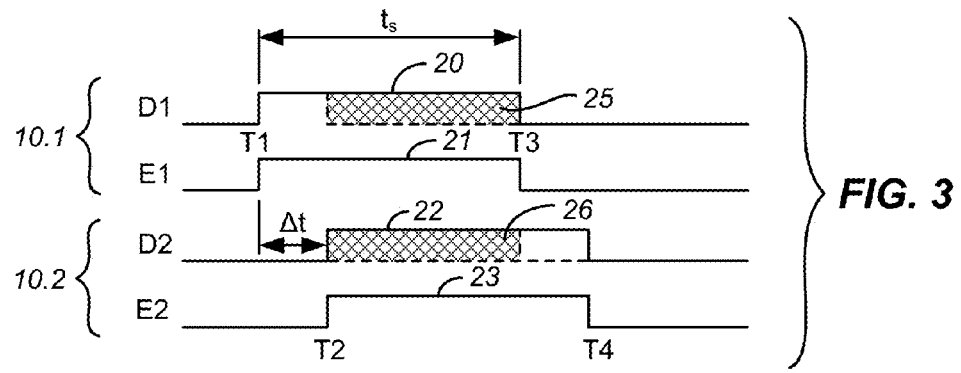
FIG. 3 shows exemplary timing diagrams illustrating the operation of detection modules and emission modules for first and second detection systems of FIG. 2.

FIG. 3 shows an example of timing diagrams illustrating the operation of detection modules 12 and emission modules 14 in an embodiment. Trace D1 illustrates the period of time 20 during which the first detection module 12.1 is operational, that is, in this example, the shutter on the camera is open so to accept light 13, or other radiation, during time period $t_s$. Trace E1 illustrates the period of time 21 the first emission module 14.1 is active so to direct the radiation pulse 15 into the region including object 16. In this example, the periods of time 20, 21 both start at the same time T1 and a stop at the same time T3. The light 13 received by the first detection module 12.1 includes object-reflected light from the pulse of light 15, and can also include light from other sources.

Trace D2 illustrates the period of time 22 the second detection module 12.2 is operational so that the camera shutter is open to accept light while trace E2 illustrates a period of time 23 the second emission module 14.2 is active to generate radiation pulse 15. In this example, time periods 22 and 23 both start at time T2, which follows time T1 and precedes time T3, and end at time T4. Time periods 20, 21, 22 and 23 are, in this example, of the same length. In other examples, time periods 20, 21, 22 and 23 need not be equal as long as any differences in radiation emitted and radiation detected, resulting from the different time periods, are accounted for.

Because of the operational offset ($\Delta t$) of time periods 20 and 21 versus time periods 22 and 23, only a portion of the light pulses from the first and second emission modules 14.1 and 14.2 is available to the first and second detection modules 12.1 and 12.2. Specifically, only the light emitted between time T2 and time T3 can be received by both detection modules 12.1 and 12.2. This directly detectable light is indicated by the double crosshatched portions of time 25, 26 in FIG. 3.

In some situations it would be useful if the operation of the first and second detection systems 10.1 and 10.2 were synchronized to maximize the amount of emitted and reflected light detectable by detection modules 12. Such synchronization can be useful to expand the field of view of the emission and detection modules and also to increase detection capabilities. One way to achieve this, sometimes referred to as the pulse synchronization method, is discussed below with regard to FIGS. 4-7.

Figure 4:
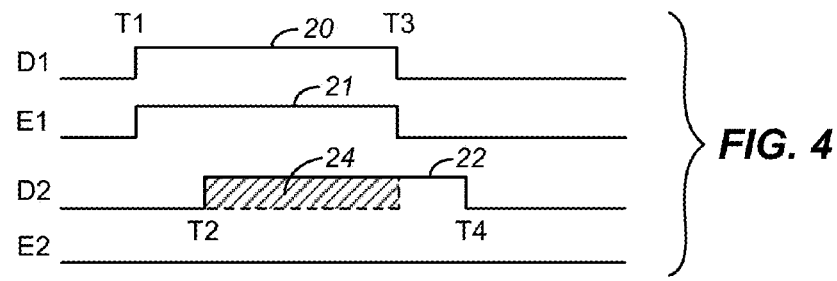
FIGS. 4-7 are timing diagrams illustrating a method for synchronizing the first and second detection systems of FIGS. 2 and 3 using a pulse synchronization method.

FIG. 4 illustrates the arrangement shown in FIG. 3 but in which the emission module 14 of the second detection system 10.2 has been inactivated as suggested by the flat trace E2 in FIG. 4. In this case the radiation captured by the second detection module 12.2 from the first emission module 14.1 is illustrated by the crosshatched section 24 of the period of time 22 of trace D2. This crosshatched section 24 corresponds to an overlapped period of time 24. The overlapped period of time 24 between time T2 and T3 can be maximized by adjusting the starting time T2 for the second detection module 12.2 and measuring the brightness perceived by the second detection module 12.2.

Figure 5:
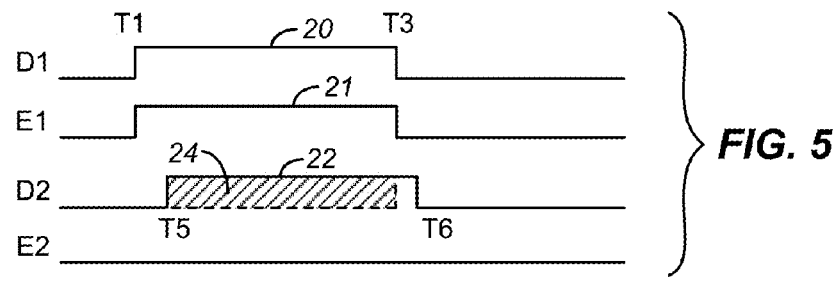
Figure 6:
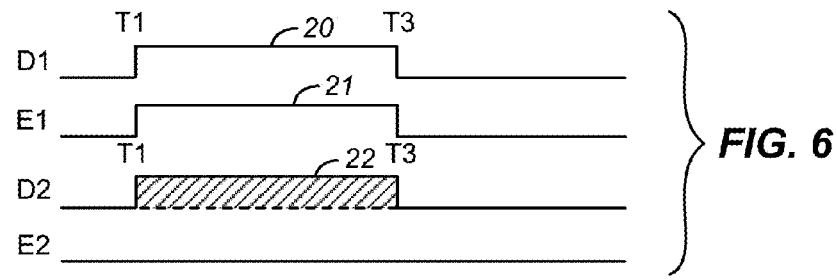
Figure 7:
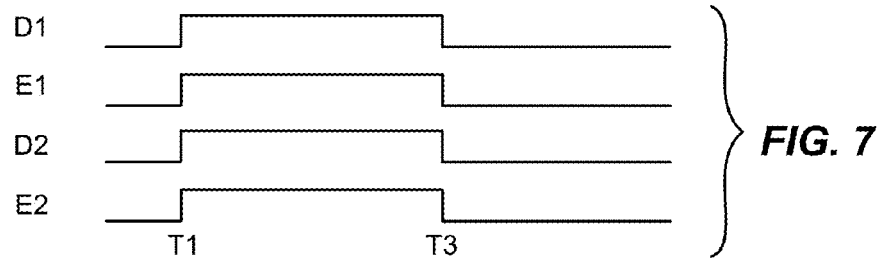

FIG. 5 illustrates the result of adjusting the starting time of second detection module 12.2 from time T2 to time T5 resulting in a larger overlapped period of time 24. This larger overlapped period of time 24 would be detected as an increase in the total brightness detected. If the measured brightness decreases instead of increases, this indicates the change of the starting time for second detection module 12.2 is proceeding in the wrong way. This process of changing the starting time for second detection module 12.2 is repeated until the brightness perceived by the second detection module 12.2 is at a maximum level. This indicates that period of time 22 for second detection module 12.2 is now beginning at or substantially at time T1. This situation is illustrated in FIG. 6. Thereafter, both detection systems 10.1 and 10.2 can begin operating with periods of time 20-23 all starting at time T1 and ending at time T3. See FIG. 7. While in this example, it is brightness which is measured, detectors can be used to detect other properties of emissions, such as differential frequencies, wavelengths, polarizations, etc., which may be used, for example, in adjusting the starting time of second detection module 12.2.

Due to operational and environmental factors, such as the shape of and orientation of object 16 and the amount and direction of any ambient radiation, starting time T1 and ending time T3 can be different for each detection system 10. Also, instead of adjusting the starting time for second detection module 12.2, the starting time for first emission module 14.1, together with the starting time for the first detection module 12.1, could be adjusted until the maximum brightness is perceived by the second detection module 12.2.

Figure 8:
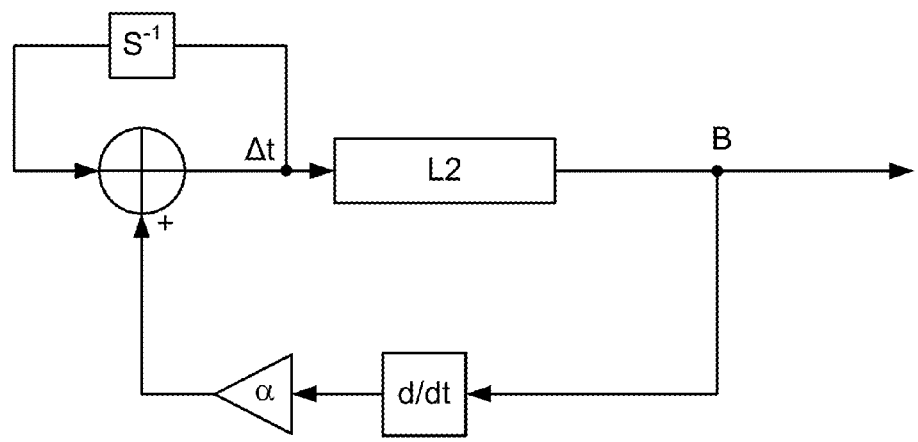
FIG. 8 shows a phase-lock feedback circuit which can be used in changing the starting time.

Changing the starting time can be based on a simple phase-lock feedback circuit, such as shown in FIG. 8 in which a time of shutter operation S of a device is shifted by $\Delta t$ based upon whether a change for one or more previous periods resulted in an improvement (time derivative) of sampled intensity B detected by device L2. The change can be scaled by a factor $\alpha$ based upon the degree of change indicated by the time derivative. The operation of one of the detection systems 10 can dynamically shift its radiation-receiving phase based on how much brightness it sees. Detection module 12 simply tunes its phase by adjusting its starting time back and forth until it perceives maximum brightness. First and second detection systems 10.1 and 10.2 will then be synchronized. The following proof shows that B[i], the intensity of radiation received by the sensor for a period i of operation of the shutter of the device L2 is given by B[i]=ts–$\Delta t$.

$$b[i] = \int_{t_s[i]} S_2(t) S_1(t) dt$$

$$S_2(t) = S_1(t - \Delta t)$$

$$b[i] = \int_{t_s[i]} S_1(t - \Delta t) S_1(t) dt$$

$$S_1(t) = U(t) - U(t - t_s)$$

$$b[i] = \int_{t_s[i]} (U(t) - U(t - t_s))(U(t - \Delta t) - U(t - \Delta t - t_s)) dt$$

$$b[i] = \int_{t_s[i]} U(t)U(t - \Delta t) - U(t - t_s)U(t - \Delta t) - U(t)U(t - \Delta t - t_s) + U(t - t_s)U(t - \Delta t - t_s) dt$$

$$b[i] = \int_{t_s[i]} U(t)U(t - \Delta t) dt - \int_{t_s[i]} U(t - t_s)U(t - \Delta t) dt - \int_{t_s[i]} U(t)U(t - \Delta t - t_x) dt + \int_{t_s[i]} U(t - t_s)U(t - \Delta t - t_s) dt$$

$$b[i] = (t_s - \Delta t) - (0) - (0) + (0)$$

$$b[i] = (t_s - \Delta t)$$

Where:
b[i]=intensity of radiation received by the sensor of a device $L_2$ for a period i of operation.
$t_s$=the period of time from T1 through T3 shown in FIG. 3
$\Delta t$=the period of time between time T1 and T2, an example shown in FIG. 3

These equations demonstrate that B[i], the intensity of radiation received by the sensor for a period i of operation of the shutter of the device L2 is given by B[i]=ts–$\Delta t$.

Two cameras behave complementary and different. L1 opens shutter S1. L1 turns on its source E1 when its shutter S1 is opened. L2 opens its shutter S2, but L2 keeps its source E2 dark. So, L2 receives light from E1 (and background noise of course). So, the integral brightness B observed at L2 includes time when S2 shutter is open and sensor of L2 receives light contribution from source E1 of L1.

Determine the degree of relatedness of two signals over a fixed time-period. This can be done by finding their convolution, correlation, continuous dot product, or any combination thereof, the emission signal S1(*t*), and reception signal S2(*t*) in line 1 because the brightness at any pixel of sensor S2 is integral over shutter period of the light intensity (input) from source E1. (As E2 is off.) When the shutter S2 closes, the brightness number returned from the pixel of L2 sensor is a sum of all light received by that pixel during the time the shutter S2 was open.

B[i] is proportionate to amount of overlap between shutter periods S1, S2 of the two sensors L1, L2 for a given instance of shutter operation i. (For this embodiment, shutter S1 opens in lock step with source E1 and shutter S2 opens in lock step with source E2. This is not necessary for operation but simply makes the math of the proof work out easier). Embodiments can be configured to increase B[i], B[i]=ts–$\Delta t$, by reducing $\Delta t$ to approach 0 by adjusting phase of the shutter of device L2 relative to the shutter of device L1 between periods i. One embodiment makes a decision to shift left or right based upon derivative of B[i] using a conventional gradient descent algorithm. Line 1: B[i] is integral of product over two signals, emission signal S1(*t*) and reception signal S2(*t*). S1(*t*) is shutter signal of shutter of device L1 and S2(*t*) is shutter signal of shutter of device L2.

Line 2: S2(*t*) can be described in terms of S1(*t*) by applying a time shift by Δt to signal S1(*t*), e.g., S1(*ts*−Δt).

Line 3: substitution of line 2 to line 1.

Line 4: represent signal S1(*t*) as unit step function (0 for all times less than 0, otherwise 1) by decomposing S1 into unit step functions.

Lines 5-x: demonstrate that all components of resulting quadratic equation go to 0 with the exception of component ts−Δt.

Accordingly, B[i], the intensity of radiation received by the sensor for a period i of operation of the shutter of the device L2 is given by B[i]=ts−Δt.

In some examples, emission modules 14 can be eliminated or not used during the synchronization procedure. Rather, radiation reflected from object 16 could be based on ambient light or other ambient radiation, natural or artificial. In some examples, radiation received by detection modules 12 could include substantial amounts of both reflected radiation from emission modules 14 and reflected ambient radiation.

In some examples, first detection system 10.1 can include an emission module 14 and second detection system 10.2 can include a detection module 12 so that, in this example, first detection system 10.1 only emits radiation and second detection system 10.2 only detects radiation. The first and second detection systems 10.1 and 10.2 are coupled to a controller 18. The first detection system 10.1 includes an emission module 14 while the second detection system 10.2 includes a detection module 12. The emission module 14 is capable of emitting radiation towards a region and the detection module 12 is capable of detecting radiation from the region. A pulse of radiation is emitted from the emission module 14. At least a part of the radiation detected by the detection module 12 is radiation received from the emission module 14. Radiation from the emission module 14 is received by the detection module 12 for a first time interval starting at time T1. Radiation from the emission module 14 is received by the detection module 12 for a second time interval starting at time T2. The radiation received by the detection module 12 during the time periods T1 and T2 is compared to determine a radiation difference measurement. The starting time for receiving radiation by the detection module 12 is adjusted based at least in part upon the radiation difference measurement, thereby aiding the synchronization of the emitting and detecting of radiation. In some examples, the starting time for emitting radiation by the emission module 14 can be adjusted based at least part on the radiation difference measurements. In some examples, the starting times for emitting and receiving radiation can be adjusted based at least in part on the radiation difference measurements.

Figure 9:
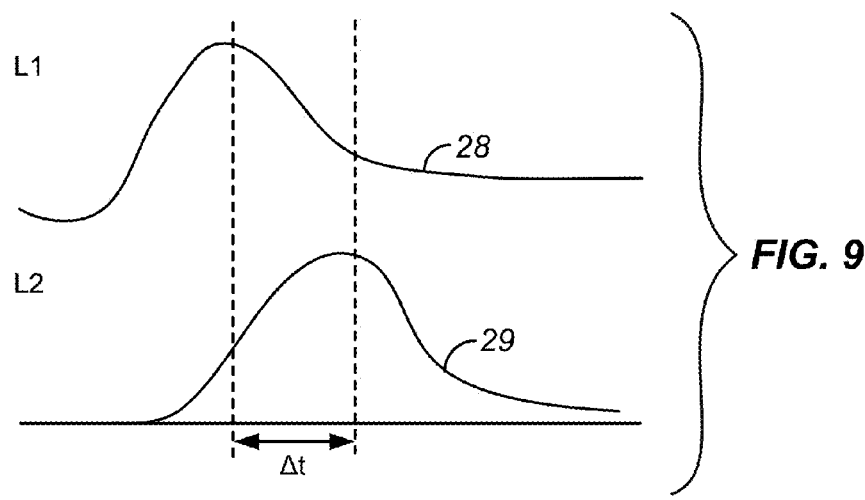
FIG. 9 shows plots of a property of the radiation received by the detection modules for first and second detection systems for use in a feature tracking synchronization method.
Figure 10:
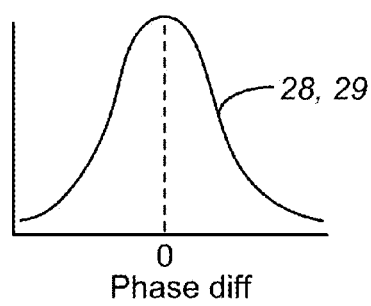
FIG. 10 shows plots of the property of the radiation when the signals are maximally correlated.

Another synchronization method, sometimes referred to as feature tracking synchronization, will be described with reference to FIGS. 9 and 10. FIG. 9 shows plots 28 and 29 of a property of the radiation received by the first and second detection modules 12.1 and 12.2 for the first and second detection systems 10.1 and 10.2. The property of the radiation indicated by plots 28 and 29 can be, for example, some salient property of the scene being tracked, such as object 16, such as finger position, hand orientation, scene brightness, or a combination of these or other properties. Plots 28 and 29 shows that this property is out of phase by time Δt in FIG. 9. Computer 18 computes the similarity of the signals, for example, by performing a rolling cross-correlation of the signals of interest corresponding to plots 28 and 29. When the signals of interest are maximally related (for example, maximally correlated), plots 28 and 29 have the smallest phase difference. Computer 18 can send instructions to detection system 10.1 and/or detection system 10.2 to change the timing of emitting and/or detecting radiation until plots 28 and 29 are in phase; this is shown in FIG. 10. Instructions can be sent to one of detection systems 10 instructing the associated emission module 14 to change when it starts emitting radiation similar to the procedure discussed above with regard to the pulse synchronization method discussed above with regard to FIGS. 4-7.

As mentioned above, the methods discussed above can be used with different types of systems to synchronize operation of first and second of the systems. The following is provided to describe in detail one type of system, specifically a machine sensory and control system.

Overview of Machine Sensory and Control Systems

In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

Figure 11:
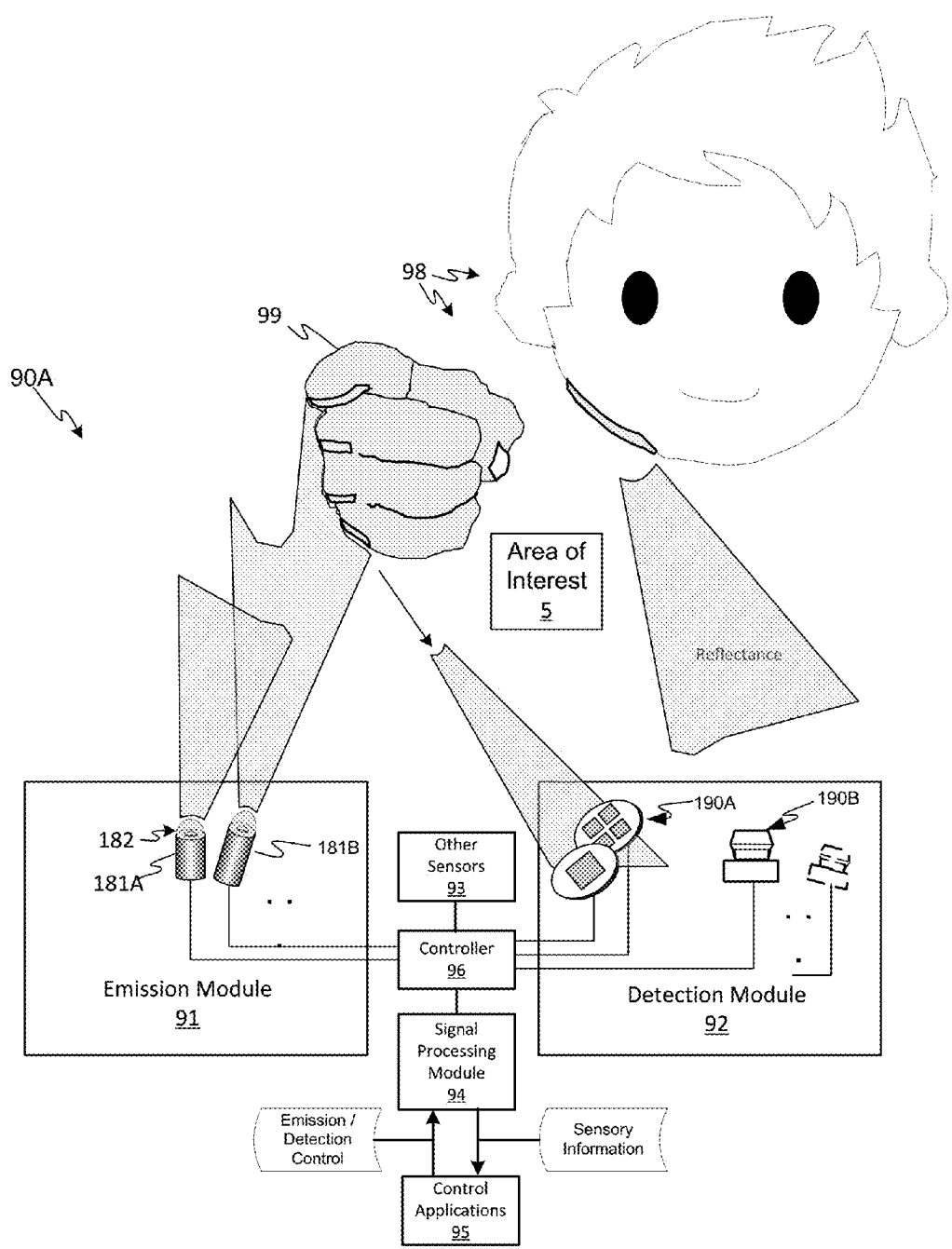
FIG. 11 shows an embodiment of a detection system including various components of the detection system along with objects within an area of interest.
Figure 12:
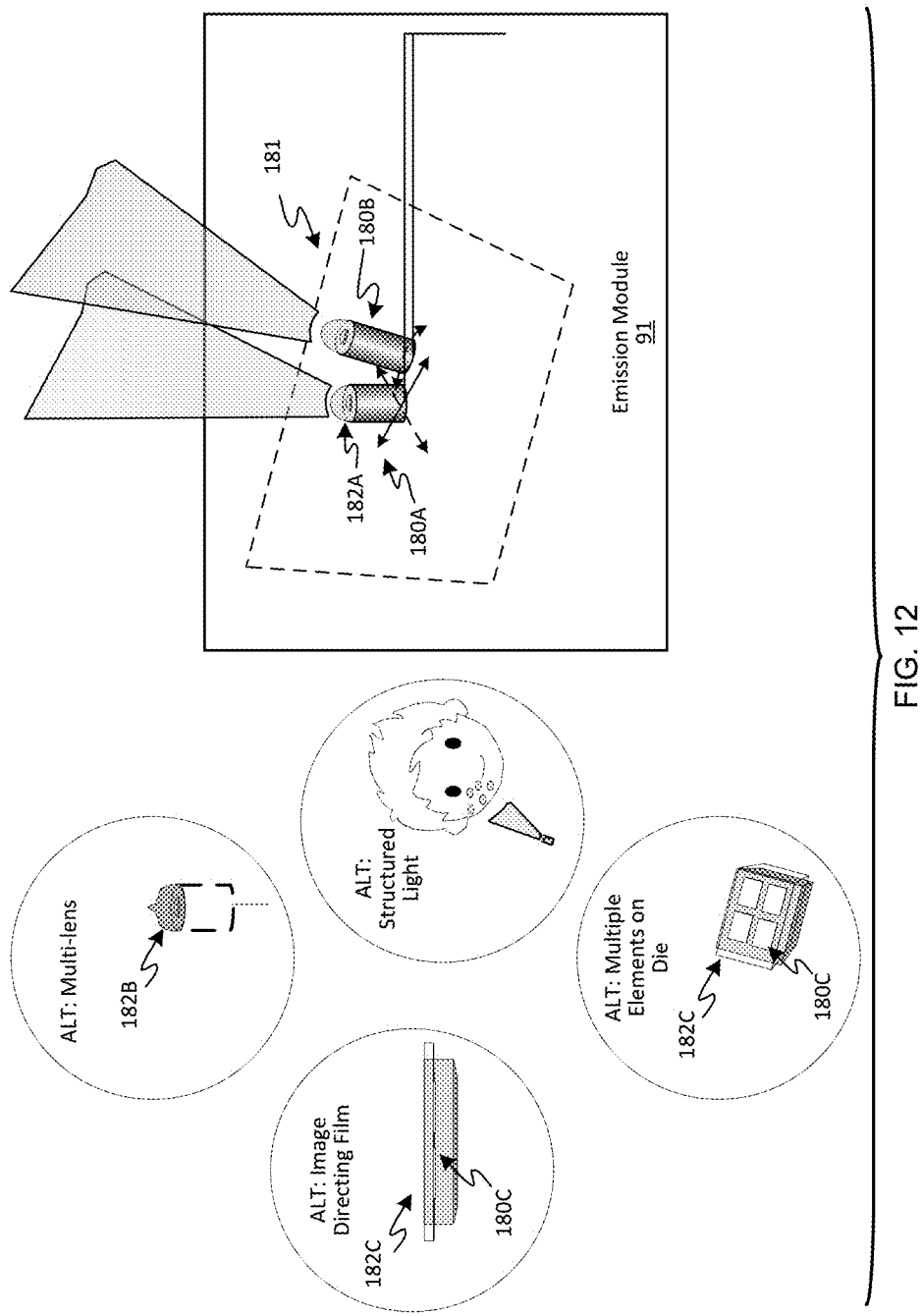
FIG. 12 illustrates an emission module showing different examples of materials or devices used with the emitters of the emission module.

As FIG. 11 shows, one detection system 90A embodiment includes an emission module 91, a detection module 92, a controller 96, a processing module 94 and a machine control module 95. In one embodiment, the emission module includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 12), image directing film (IDF) 182C (of FIG. 12), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 12) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

Figure 13:
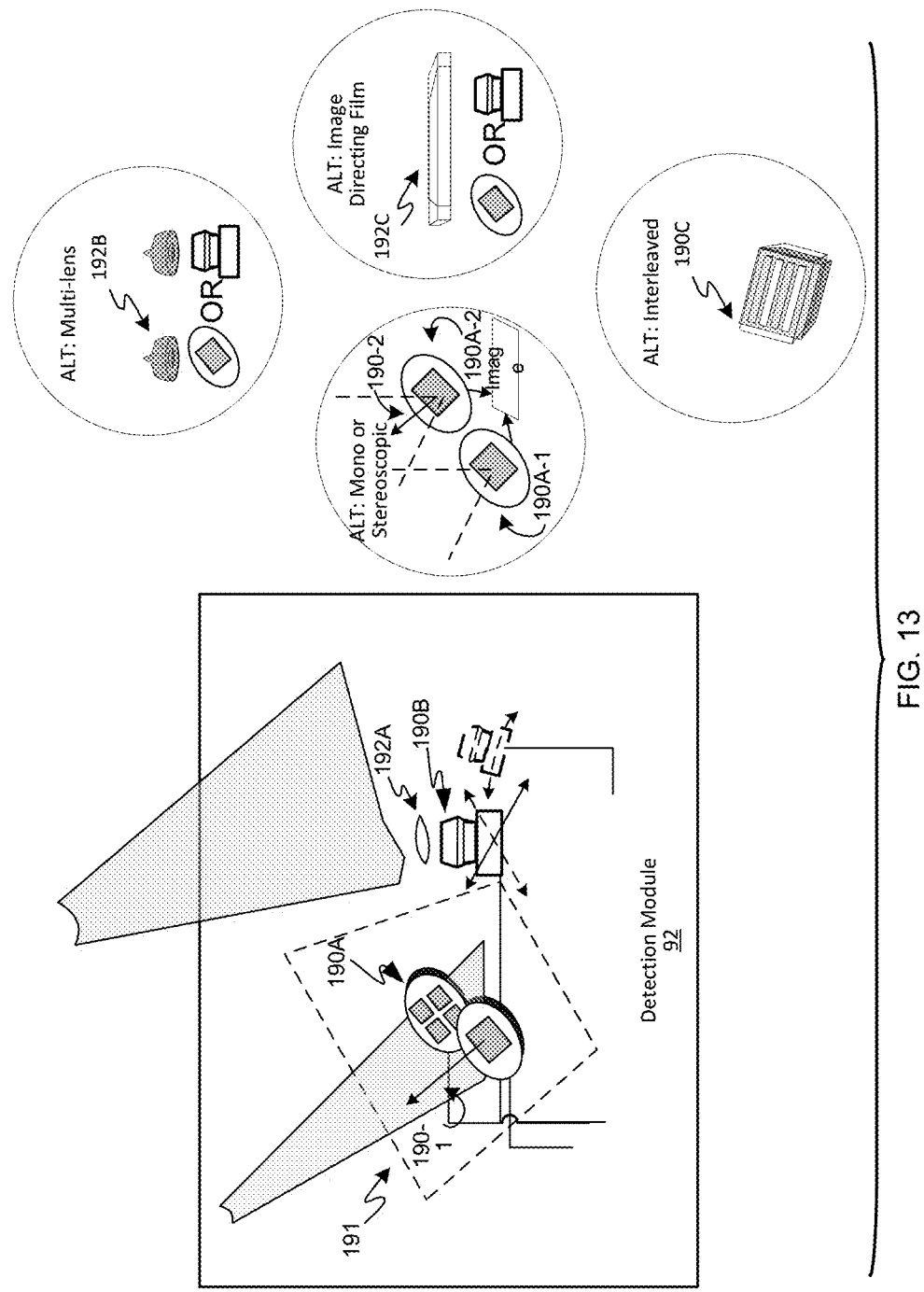
FIG. 13 shows a detection module including capture devices coupled with different types of devices and/or material, such as lenses and image directing film, for capturing images of and information about an object.

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 13) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 13) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 13) (e.g., lenses 192A (of FIG. 13), multi-lenses 192B (of FIG. 13), image directing film (IDF) 192C (of FIG. 13), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof; or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc.). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 13), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor-perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variations) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

Figure 14:
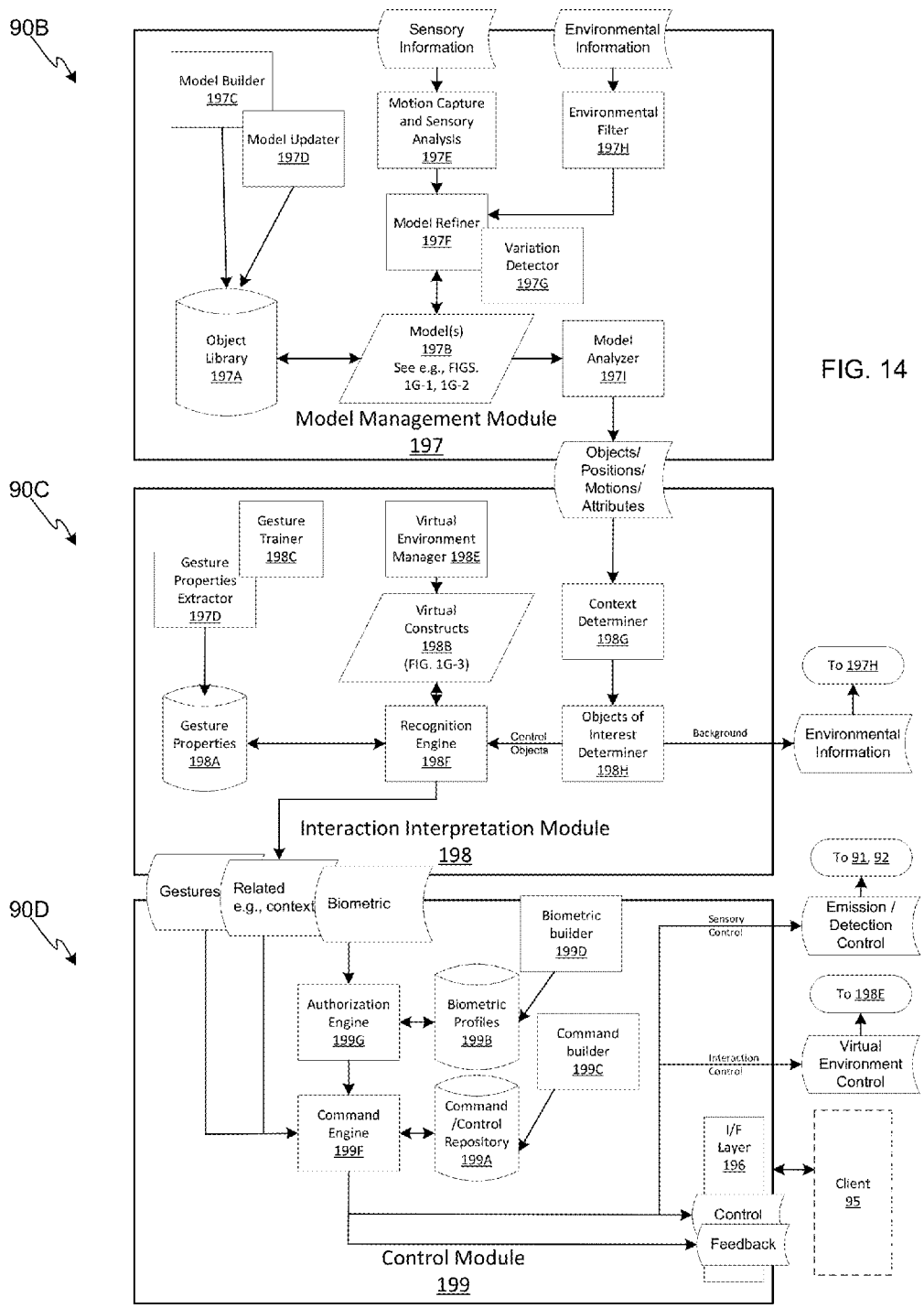
FIG. 14 is a flow diagram of a variation determination system, an interaction system and an application control system.

For example, and with reference to FIG. 14, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 15, 16)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1-197B-2 of FIGS. 15-16), useful to define and update models 197B, and model attributes 197-5. While illustrated with reference to a particular embodiment in which models, model components and attributes are co-located within a common object library 197A, it should be understood that these objects will be maintained separately in some embodiments.

Figure 15:
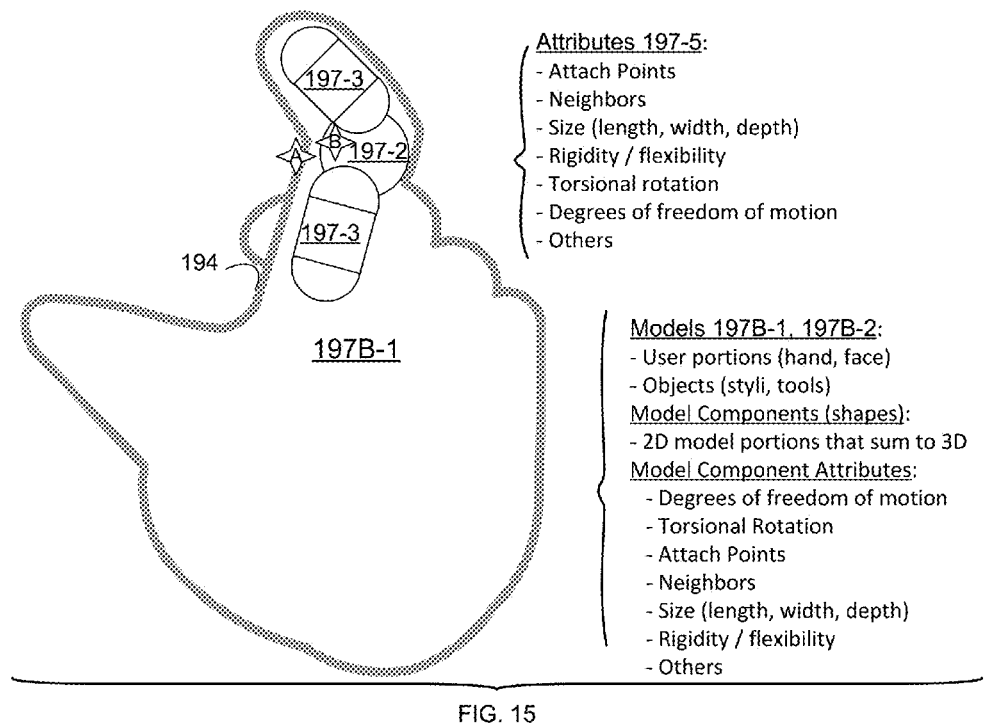
FIG. 15 illustrates prediction information including a model of the control object.

FIG. 15 illustrates prediction information including a model 197B-1 of a control object (e.g., FIG. 11: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 15 for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

Figure 16:
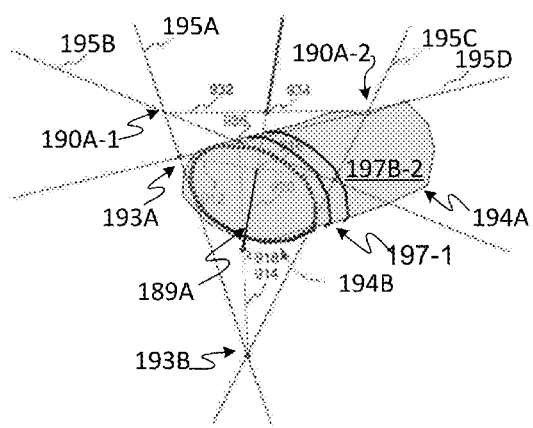
FIG. 16 shows sets of points in space created by the intersection of lines surrounding a cross-section of the object.

In an embodiment, and with reference to FIGS. 11, 16, updating predictive information to observed information comprises selecting one or more sets of points (e.g., FIG. 16: 193A, 193B) in space surrounding or bounding the control object within a field of view of one or more image capture device(s). As shown by FIG. 16, points 193 can be determined using one or more sets of lines 195A, 195B, 195C, and 195D originating at vantage point(s) (e.g., FIG. 11: 190-1, 190-2) associated with the image capture device(s) (e.g., FIG. 11: 190A-1, 190A-2) and determining therefrom one or more intersection point(s) defining a bounding region (i.e., region formed by lines FIG. 16: 195A, 195B, 195C, and 195D) surrounding a cross-section of the control object. The bounding region can be used to define a virtual surface (FIG. 16: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example, and according to one embodiment illustrated by FIG. 16, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and $\theta$ the rotation angle. The coefficients $C_1$, $C_2$ and $C_3$ are defined in terms of these parameters, as shown:

$$C_1 x^2 + C_2 xy + C_3 y^2 \cdot (2C_1 x_c + C_2 y_c)x \cdot (2C_3 y_c + C_2 x_c)y + \quad (1)$$
$$(C_1 x_c^2 + C_2 x_c y_c + C_3 y_c^2 \cdot 1) = 0$$

$$C_1 = \frac{\cos^2 \theta}{a^2} + \frac{\sin^2 \theta}{b^2}$$

$$C_2 = -2\cos\theta\sin\theta\left(\frac{1}{a^2} - \frac{1}{b^2}\right)$$

-continued $$C_3 = \frac{\sin^2 \theta}{a^2} + \frac{\cos^2 \theta}{b^2}$$

The ellipse equation (1) is solved for $\theta$, subject to the constraints that: (1) $(x_C, y_C)$ must lie on the centerline determined from the four tangents 195A, 195B, 195C, and 195D (i.e., centerline 189A of FIG. 16); and (2) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$

$$A_2 x + B_2 y + D_2 = 0$$

$$A_3 x + B_3 y + D_3 = 0$$

$$A_4 x + B_4 y + D_4 = 0 \quad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \quad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1 = (r_{13} + r_{24})/2$$

$$c2 = (r_{14} + r_{23})/2$$

$$\delta 1 = c2_1 - c1_1$$

$$\delta 2 = c2_2 - c1_2$$

$$p = \delta 1/\delta 2$$

$$q = c1_1 - c1_2 * p$$

$$G = Ap + B$$

$$H = Aq + D \quad (4)$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \backslash \begin{bmatrix} 0 \\ 0 \\ 1 \end{bmatrix} \quad (5)$$

$$w = \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1 A_1)^2 + (v_2 A_2)^2 + (v_3 A_3)^2$$

$$v_{AB} = (v_1 A_1 B_1)^2 + (v_2 A_2 B_2)^2 + (v_3 A_3 B_3)^2$$

$$v_{B2} = (v_1 B_1)^2 + (v_2 B_2)^2 + (v_3 B_3)^2$$

$$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2$$

Using the parameters defined in equations (1)-(5), solving for $\theta$ is accomplished by solving the eighth-degree polynomial equation (6) for t, where the coefficients $Q_i$ (for i=0 to 8) are defined as shown in equations (7)-(15).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \quad (6)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of $\theta$ are defined as $\theta = a\tan(t)$.

$$Q_8 = 4 A_1^2 n^2 v_{B2}^2 + \quad (7)$$
$$4 v_{B2} B_1^2 (1 \cdot n^2 v_{A2}) \cdot (G_1(1 \cdot n^2 v_{A2}) w_{B2} + n^2 v_{B2} w_{A2} + 2 H_1 v_{B2})^2$$

$$Q_7 = \quad (8)$$
$$-(2(2n^2 v_{AB} w_{A2} + 4 H_1 v_{AB} + 2 G_1 n^2 v_{AB} w_{B2} + 2 G_1(1 \cdot n^2 v_{A2}) w_{AB}))$$
$$(G_1(1 \cdot n^2 v_{A2}) w_{B2} + n^2 v_{B2} w_{A2} + 2 H_1 v_{B2}) -$$
$$8 A_1 B_1 n^2 v_{B2}^2 + 16 A_1^2 n^2 v_{AB} v_{B2} +$$
$$(4(2 A_1 B_1 (1 \cdot n^2 v_{A2}) + 2 B_1^2 n^2 v_{AB})) v_{B2} + 8 B_1^2 (1 - n^2 v_{A2}) v_{AB}$$

$$Q_6 = -(2(2 H_1 v_{B2} + 2 H_1 v_{A2} + n^2 v_{A2} w_{A2} + \quad (9)$$
$$n^2 v_{B2}(-2 w_{AB} + w_{B2}) + G_1(n^2 v_{B2} + 1) w_{B2} +$$
$$4 G_1 n^2 v_{AB} w_{AB} + G_1(1 - n^2 v_{A2}))$$
$$x(G_1(1 - n^2 v_{A2}) w_{B2} + n^2 v_{B2} w_{A2} + 2 H_1 v_{B2}) -$$
$$(2n^2 v_{AB} w_{A2} + 4 H_1 v_{AB} + 2 G_1 n^2 v_{AB} w_{B2} + 2 G_1(1 - n^2 v_{A2}) w_{AB})^2 +$$
$$4 B_1^2 n^2 v_{B2}^2 -$$
$$32 A_1 B_1 n^2 v_{AB} v_{B2} +$$
$$4 A_1^2 n^2 (2 v_{A2} v_{B2} + 4 v_{AB}^2) +$$
$$4 A_1^2 n^2 v_{B2}^2 +$$
$$(4(A_1^2(1 - n^2 v_{A2}) + 4 A_1 B_1 n^2 v_{AB} +$$
$$B_1^2(-n^2 v_{B2} + 1) + B_1^2(1 - n^2 v_{A2}))) v_{B2} +$$
$$(B(2 A_1 B_1 (1 - n^2 v_{A2}) + B_1^2 n^2 v_{AB})) v_{AB} +$$
$$4 B_1^2 (1 - n^2 v_{A2}) v_{A2}$$

$$Q_5 = -(2(4 H_1 v_{AB} + 2 G_1(-n^2 v_{B2} + 1) w_{AB} + \quad (10)$$
$$2 G_1 n^2 v_{AB} v_{A2} + 2 n^2 v_A (-2 w_{AB} + w_{B2})))$$
$$(G_1(1 - n^2 v_{A2}) w_{B2} + n^2 v_{B2} w_{A2} + 2 H_1 v_{B2}) -$$
$$(2(2 H_1 v_{B2} + 2 H_1 v_{A2} + n^2 v_{A2} w_{A2} +$$
$$n^2 v_{B2}(-2 w_{AB} + w_{B2}) + G_1(-n^2 v_{B2} + 1) w_{B2} +$$
$$4 G_1 n^2 v_{AB} w_{AB} + G_1(1 - n^2 v_{A2}) v_{A2}))$$
$$x(2 n^2 v_{AB} w_{A2} + 4 H_1 v_{AB} + 2 G_1 n^2 v_{AB} w_{B2} +$$
$$2 G_1(1 - n^2 v_{A2}) w_{AB}) +$$
$$16 B_1^2 n^2 v_{AB} v_{B2} \cdot 8 A_1 B_1 n^2 (2 v_{A2} v_{B2} + 4 v_{AB}^2) +$$
$$16 A_1^2 n^2 v_{A2} v_{AB} -$$
$$8 A_1 B_1 n^2 v_{B2}^2 +$$
$$16 A_1^2 n^2 v_{AB} v_{B2} +$$
$$(4(2 A_1^2 n^2 v_{AB} + 2 A_1 B_1 (-n^2 v_{B2} + 1) +$$
$$2 A_1 B_1 (1 - n^2 v_{A2}) + 2 B_1^2 n^2 v_{AB})) v_{B2} +$$
$$(8(A_1^2 (1 - n^2 v_{A2}) + 4 A_1 B_1 n^2 v_{AB} + B_1^2 (-n^2 v_{B2} + 1) +$$
$$B_1^2 (1 - n^2 v_{A2}))) v_{AB} +$$
$$(4(2 A_1 B_1 (1 - n^2 v_{A2}) + 2 B_1^2 n^2 v_{AB})) v_{A2}$$

$$Q_4 = \quad (11)$$
$$(4(A_1^2 (-n^2 v_{B2}) + A_1^2 (1 - n^2 v_{A2}) + 4 A_1 B_1 n^2 v_{AB} + B_1^2 (-n^2 v_{B2} + 1)))$$
$$v_{B2} + (8(2 A_1^2 n^2 v_{AB} + 2 A_1 B_1 (-n^2 v_{B2} + 1) +$$
$$2 A_1 B_1 (1 - n^2 v_{A2}) + 2 B_1^2 n^2 v_{AB})) v_{AB} +$$
$$(4(A_1^2 (1 - n^2 v_{A2}) + 4 A_1 B_1 n^2 v_{AB} + B_1^2 (-n^2 v_{B2} + 1) +$$
$$B_1^2 (1 - n^2 v_{A2}))) v_{A2} +$$
$$4 B_1^2 n^2 (2 v_{A2} v_{B2} + 4 v_{AB}^2) - 32 A_1 B_1 n^2 v_{A2} v_{AB} +$$
$$4 A_1^2 n^2 v_{A2}^2 + 4 B_1^2 n^2 v_{B2}^2 -$$
$$32 A_1 B_1 n^2 v_{AB} v_{B2} +$$
$$4 A_1^2 n^2 (2 v_{A2} v_{B2} + 4 v_{AB}^2) -$$
$$(2(G_1(-n^2 v_{B2} + 1) v_{A2} + n^2 v_{A2}(-2 w_{AB} + w_{B2}) + 2 H_1 v_{A2}))$$
$$(G_1(1 - n^2 v_{A2}) w_{B2} + n^2 v_{B2} w_{A2} + 2 H_1 v_{B2}) -$$
$$(2(4 H_1 v_{AB} + 2 G_1(-n^2 v_{B2} + 1) w_{AB} + 2 G_1 n^2 v_{AB} v_{A2} +$$
$$2 n^2 v_{AB}(-2 w_{AB} + w_{B2}))) x(2 n^2 v_{AB} w_{A2} +$$
$$4 H_1 v_{AB} + 2 G_1 n^2 v_{AB} w_{B2} + 2 G_1 (1 - n^2 v_{A2}) w_{AB}) -$$
$$(2 H_1 v_{B2} + 2 H_1 v_{A2} + n^2 v_{A2} w_{A2} + n^2 v_{B2}(-2 w_{AB} + w_{B2}) +$$
$$G_1(-n^2 v_{B2} + 1) w_{B2} + 4 G_1 n^2 v_{AB} w_{AB} + G_1(1 -$$
$$n^2 v_{A2}) v_{A2})$$

$$Q_3 = -(2(G_1(-n^2 v_{B2} + 1) v_{A2} + n^2 v_{A2}(-2 w_{AB} + w_{B2}) + 2 H_1 v_{A2})) \quad (12)$$
$$(2 n^2 v_{AB} w_{A2} + 4 H_1 v_{AB} + 2 G_1 n^2 v_{AB} w_{B2} + 2 G_1(1 - n^2 v_{A2}) w_{AB}) -$$
$$(2(4 H_a v_{AB} + 2 G_1(-n^2 v_{B2} + 1) w_{AB} + 2 G_1 n^2 v_{AB} v_{A2} +$$
$$2 n^2 v_{AB}(-2 w_{AB} + w_{B2})) x(2 H_1 v_{B2} + 2 H_1 v_{A2} +$$
$$n^2 v_{A2} w_{A2} + n^2 v_{B2}(-2 w_{AB} + w_{B2}) + G_1(-n^2 v_{B2} + 1) w_{B2} +$$
$$4 G_1 n^2 v_{AB} w_{AB} + G_1(1 - n^2 v_{A2}) +$$
$$16 B_1^2 n^2 v_{A2} v_{AB} - 8 A_1 B_1 n^2 v_{A2}^2 + 16 B_1^2 n^2 v_{AB} v_{B2} -$$
$$8 A_1 B_1 n^2 (2 v_{A2} v_{B2} + 4 v_{AB}^2) + 16 A_1^2 n^2 v_{A2} v_{AB} +$$
$$(4(2 A_1^2 n^2 v_{AB} + 2 A_1 B_1 (-n^2 v_{B2} + 1))) v_{B2} + (8(A_1^2 (-n^2 v_{B2} + 1) +$$
$$A_1^2 (1 - n^2 v_{A2}) + A_1 B_1 n^2 v_{AB} + B_1^2 (-n^2 v_{B2} + 1))$$
$$0 v_{AB} + (4(2 A_1^2 n^2 v_{AB} + 2 A_1 B_1 (-n^2 v_{B2} + 1) +$$
$$2 A_1 B_1 (1 - n^2 v_{A2}) + 2 B_1^2 n^2 v_{AB})) v_{A2}$$

$$Q_2 = \quad (13)$$
$$4 A_1^2 (-n^2 v_{B2} + 1) v_{B2} + (8(2 A_1^2 n^2 v_{AB} + 2 A_1 B_1 (-n^2 v_{B2} + 1))) v_{AB} +$$
$$(4(A_1^2 (-n^2 v_{B2} + 1) + A_1^2 (1 - n^2 v_{A2}) + 4 A_1 B_1 n^2 v_{AB} +$$
$$B_1^2 (-n^2 v_{B2} + 1))) v_{A2} + 4 B_1^2 n^2 v_{A2}^2 +$$
$$4 B_1^2 b^2 (2 v_{A2} v_{B2} + 4 v_{AB}^2) - 32 A_1 B_1 n^2 v_{A2} v_{AB} + 4 A_1^2 n^2 v_{A2}^2 -$$
$$(2(G_1(-n^2 v_{B2} + 1) v_{A2} + n^2 v_{A2}(-2 w_{AB} + w_{B2}) + 2 H_1 v_{A2}))$$
$$x(2 H_1 v_{B2} + 2 H_1 v_{A2} + n^2 v_{A2} w_{A2} + n^2 v_{B2}(-w_{AB} + w_{B2}) +$$
$$G_1(-n^2 v_{B2} + 1) w_{B2} + 4 G_1 n^2 v_{AB} w_{AB} + G_1(1 - n^2 v_{A2}) -$$
$$v_{AB} + 2 G_1(-n^2 v_{B2} + 1) w_{AB} + 2 G_1 n^2 v_{AB} v_{A2} + 2 n^2 v_{AB}(-2 w_{AB} + w_{B2}))^2$$

-continued $$Q_1 = \\ 8A_1^2(-n^2v_{B2}+1)v_{AB} + (4(2A_1^2n^2v_{AB}+2A_1B_1(-n^2v_{B2}+1)))v_{A2} + \\ 16B_1^2n^2v_{A2}v_{AB} - 8A_1B_1n^2v_{A2}^2 - \\ (2(G_1(-n^2v_{B2}+1)v_{A2}+n^2v_{A2}(-2w_{AB}+w_{B2})+2H_1v_{A2})) \\ (4H_1v_{AB}+2G_1(-n^2v_{B2}+1)w_{AB} + \\ 2G_1n^2v_{AB}v_{A2}+2n^2v_{AB}(-2w_{AB}+w_{B2})) \quad (14)$$

$$Q_0 = 4A_1^2(-n^2v_{B2}+1)v_{A2} - \\ (G_1(-n^2v_{B2}+1)v_{A2}+n^2v_{A2}(-2w_{AB}+w_{B2})+2H_1v_{A2})^2 + \\ 4B_1^2n^2v_{A2}^2 \quad (15)$$

In this exemplary embodiment, equations (6)-(15) have at most three real roots; thus, for any four tangent lines, there are at most three possible ellipses that are tangent to all four lines and that satisfy the $a=a_0$ constraint. (In some instances, there may be fewer than three real roots.) For each real root θ, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters $\{θ, a=a_0, b, (x_C, y_C)\}$. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Figure 17:
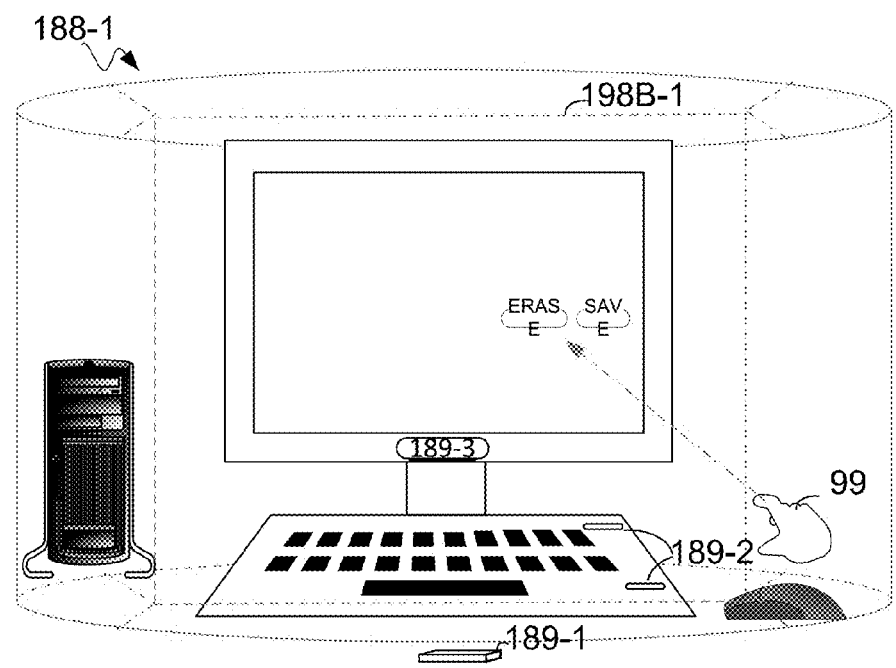
FIG. 17 illustrates a three-dimensional virtual construct relative to a keyboard and computer screen so that movement into and out of a particular region indicates control or other useful information.

Again with reference to FIG. 14, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as command inputs (i.e., gestures and/or other command inputs (e.g., speech, etc.)), related information (i.e., biometrics), environmental information (i.e., context, noise, etc.) and other information discernible from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 17, 18: 198B-1, 198B-2) to recognize variations in control object presence or motion indicating command information, related information, environmental information and other information discernible from the object, position, motion and attribute information that might be useful in controlling a machine. With reference to FIG. 17, 18, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

Figure 18:
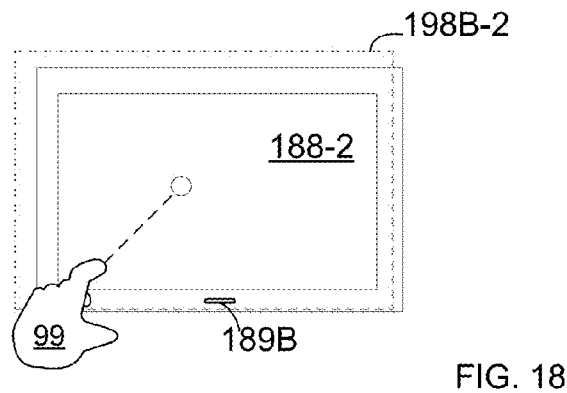
FIG. 18 illustrates a somewhat simplified virtual construct in a region forward of a computer screen.

A virtual environment manager 198E provides creation, selection, modification and de-selection of one or more virtual constructs 198B (see FIGS. 17, 18). In some embodiments, virtual constructs (e.g., a virtual object defined in space; such that variations in real objects relative to the virtual construct, when detected, can be interpreted for control or other purposes (see FIGS. 17, 18)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernible from the object, position, motion and attribute information that might be useful in controlling a machine from recognition engine 198F to an application control system 90D.

Further with reference to FIG. 14, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernible from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments, and with reference to FIGS. 17, 18, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 17: 189-2, 189-3, FIG. 18: 189B) or combinations thereof.

While the technology is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the disclosed technology and the scope of the following claims.

Any and all patents, patent applications and printed publications referred to above are incorporated by reference.

What is claimed is:

1. A method for synchronizing operation of first and second detection systems coupled to a controller, the first detection system including a first emission module and a first detection module, the second detection system including a second detection module, the emission module capable of emitting radiation towards a region and the detection modules capable of detecting radiation from the region, the method comprising:
    emitting a pulse of radiation from the first emission module;
    detecting the emitted radiation by the first and second detection modules, the detected radiation at least in part from the pulse of radiation, by:
        receiving, by the first detection module, radiation from the first emission module for a first time interval starting at time T1; and
        receiving, by the second detection module, radiation from the first emission module for a second time interval starting at time T2;
    comparing the radiation received by the first and second detection modules to determine a radiation difference measurement; and
    adjusting the starting time T2 relative to starting time T1 based at least in part upon the radiation difference measurement to determine a revised starting time T2, thereby aiding the synchronization of starting time T2 with starting time T1.

2. The method according to claim 1, wherein the emitting step comprises emitting a pulse of radiation to an object within the region.

3. The method according to claim 2, wherein:
    the radiation received by the first detection module from the first emission module includes radiation from the object; and
    the radiation received by the second detection module from the first emission module includes radiation from the object.

4. The method according to claim 2, wherein:
    the radiation comparing comprises:
        determining a property of the radiation received by each of the first and second detection modules based on a physical feature of the object;
        determining a phase of the property of the radiation for each of the first and second detection modules; and
        wherein determining a difference between the phases for the first and second detection modules; and
    wherein the adjusting comprises adjusting the starting time T2 relative to the starting time T1 to reduce the difference between the phases.

5. The method according to claim 1, further comprising:
    repeating the emitting, detecting, comparing and adjusting until the radiation difference measurement reaches a desired value.

6. The method according to claim 1, wherein the pulse of radiation emitting starts at time T1.

7. The method according to claim 6, wherein the pulse of radiation emitting stops at time T3, time T3 following time T2 for at least an initial radiation emission and an initial radiation detection.

8. The method according to claim 6, wherein the pulse of radiation emitting stops at time T3, and the first detection module radiation receiving also stops at time T3.

9. The method according to claim 1, wherein the following lengths of time are equal: (1) the length of time the pulse of radiation is emitted by the first emission module, (2) the first time interval, and (3) the second time interval.

10. The method according to claim 1, wherein the comparing comprises comparing an amount of the radiation received by the first detection module and an amount of radiation received by the second detection module.

11. A method for synchronizing operation of first and second detection systems, the first and second detection systems respectively including first and second detection modules coupled to a controller, the detection modules capable of detecting radiation from a region, the method comprising:
  detecting radiation from a region by the first and second detection modules by:
    receiving, by the first detection module, radiation from the region for a first time interval starting at time T1; and
    receiving, by the second detection module, radiation from the region for a second time interval starting at time T2;
  comparing the radiation received by the first and second detection modules to determine a radiation difference measurement; and
  adjusting the starting time T2 relative to starting time T1 followed by repeating the detecting and the comparing until the radiation difference measurement reaches a desired value.

12. The method according to claim 11, further comprising:
  repeating the detecting, comparing and adjusting until the radiation difference measurement reaches a desired value.

13. The method according to claim 11, wherein the comparing comprises comparing an amount of the radiation received by the first detection module and an amount of radiation received by the second detection module.

14. A method for synchronizing operation of first and second detection systems coupled to a controller, the first detection system including an emission module, the second detection system including a detection module, the emission module capable of emitting radiation towards a region and the detection module capable of detecting radiation from the region, the method comprising:
  emitting a pulse of radiation from the emission module;
  detecting the emitted radiation by the detection module, the detected radiation at least in part from the pulse of radiation, by:
    receiving, by the detection module, radiation from the emission module for a first time interval starting at time T1;
    receiving, by the detection module, radiation from the emission module for a second time interval starting at time T2; and
    comparing the radiation received by the detection module during the time periods T1 and T2 to determine a radiation difference measurement; and
  adjusting the starting time for receiving radiation by the detection module based at least in part upon the radiation difference measurement, thereby aiding the synchronization of the emitting and detecting of radiation.

15. A method for synchronizing operation of first and second systems, the first and second systems respectively including first and second detection modules coupled to a controller, the detection modules capable of detecting a pulsed signal, the method comprising:
  detecting a pulsed signal by the first and second detection modules by:
    receiving, by the first detection module, a pulsed signal for a first time interval starting at time T1; and
    receiving, by the second detection module, a pulsed signal for a second time interval starting at time T2;
  comparing the pulsed signals received by the first and second detection modules to determine a signal difference measurement; and
  adjusting the starting time T2 relative to starting time T1 followed by repeating the detecting and the comparing until the signal difference measurement reaches a desired value.

* * * * *